United States Patent
Li et al.

(10) Patent No.: US 11,062,504 B1
(45) Date of Patent: Jul. 13, 2021

(54) METHOD FOR GENERATING MODEL OF SCULPTURE OF FACE, COMPUTING DEVICE, AND NON-TRANSITORY STORAGE MEDIUM

(71) Applicant: Ping An Technology (Shenzhen) Co., Ltd., Shenzhen (CN)

(72) Inventors: Minghao Li, Mountain View, CA (US); Jinghong Miao, San Jose, CA (US); Yuchuan Gou, Sunnyvale, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/729,117

(22) Filed: Dec. 27, 2019

(51) Int. Cl.
  *G06T 15/20* (2011.01)
  *G06T 5/00* (2006.01)
  *G06K 9/00* (2006.01)

(52) U.S. Cl.
  CPC ........ *G06T 15/205* (2013.01); *G06K 9/00275* (2013.01); *G06K 9/00281* (2013.01); *G06T 5/002* (2013.01); *G06T 2207/20081* (2013.01); *G06T 2207/20084* (2013.01); *G06T 2207/30201* (2013.01)

(58) Field of Classification Search
  None
  See application file for complete search history.

(56) References Cited

U.S. PATENT DOCUMENTS

| | | | | |
|---|---|---|---|---|
| 2009/0244082 | A1* | 10/2009 | Livingston | G06K 9/4609 345/581 |
| 2015/0049169 | A1* | 2/2015 | Krig | H04N 13/211 348/46 |
| 2015/0084950 | A1* | 3/2015 | Li | G06K 9/00214 345/419 |
| 2015/0302592 | A1* | 10/2015 | Bruls | G06T 7/50 348/44 |
| 2019/0043254 | A1* | 2/2019 | Taubin | G06T 15/08 |
| 2019/0096035 | A1* | 3/2019 | Li | G06T 3/4053 |
| 2019/0130278 | A1* | 5/2019 | Karras | G06N 3/082 |
| 2019/0164341 | A1* | 5/2019 | Venkataraman | G06T 7/149 |
| 2019/0171936 | A1* | 6/2019 | Karras | G06N 3/0454 |
| 2020/0013212 | A1* | 1/2020 | Wang | G06T 15/04 |
| 2020/0051303 | A1* | 2/2020 | Li | G06T 17/20 |
| 2020/0105028 | A1* | 4/2020 | Gao | G06T 7/50 |
| 2020/0226419 | A1* | 7/2020 | Knaan | H04N 5/247 |
| 2020/0380661 | A1* | 12/2020 | Qiu | G06N 3/04 |

* cited by examiner

*Primary Examiner* — Jeffrey J Chow
(74) *Attorney, Agent, or Firm* — ScienBiziP, P.C.

(57) ABSTRACT

A method for generating a model for facial sculpture based on a generative adversarial network (GAN) includes training a predetermined GAN based on a three dimensional (3D) face dataset of multiple 3D face images to obtain an initial sculpture generation model. A curvature conversion on each of the multiple 3D face images is performed to obtain a distribution map of curvature value and the distribution map of curvature value of each of the multiple 3D face images is added as attention information to the initial sculpture generation model, to train and generate a face sculpture generation model. A target 3D face data and predetermined face curvature parameters are received, and the target 3D face data and the predetermined face curvature parameters are inputted into the face sculpture generation model to generate a face sculpture model. A computing device using the method is also provided.

20 Claims, 6 Drawing Sheets

METHOD FOR GENERATING MODEL OF SCULPTURE OF FACE, COMPUTING DEVICE, AND NON-TRANSITORY STORAGE MEDIUM

FIELD

The subject matter herein generally relates to a technical field of deep learning, specifically a facial sculpture model generating method, a computing device, and a non-transitory storage medium.

BACKGROUND

Generative Adversarial Network (GAN) is developed and applied to increasing numbers of real life situations. A trained GAN has been able to generate various styles of images, such as animal images, landscape images, and portraits of people. The application scenarios of the GAN are more focused on generation of real pictures, and less on generation of artistic pictures or sculptures.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

Terms such as "first", "second" and the like in the specification and in the claims of the present disclosure and the above drawings are used to distinguish between different objects, and are not intended to describe a specific order.

Figure 1:
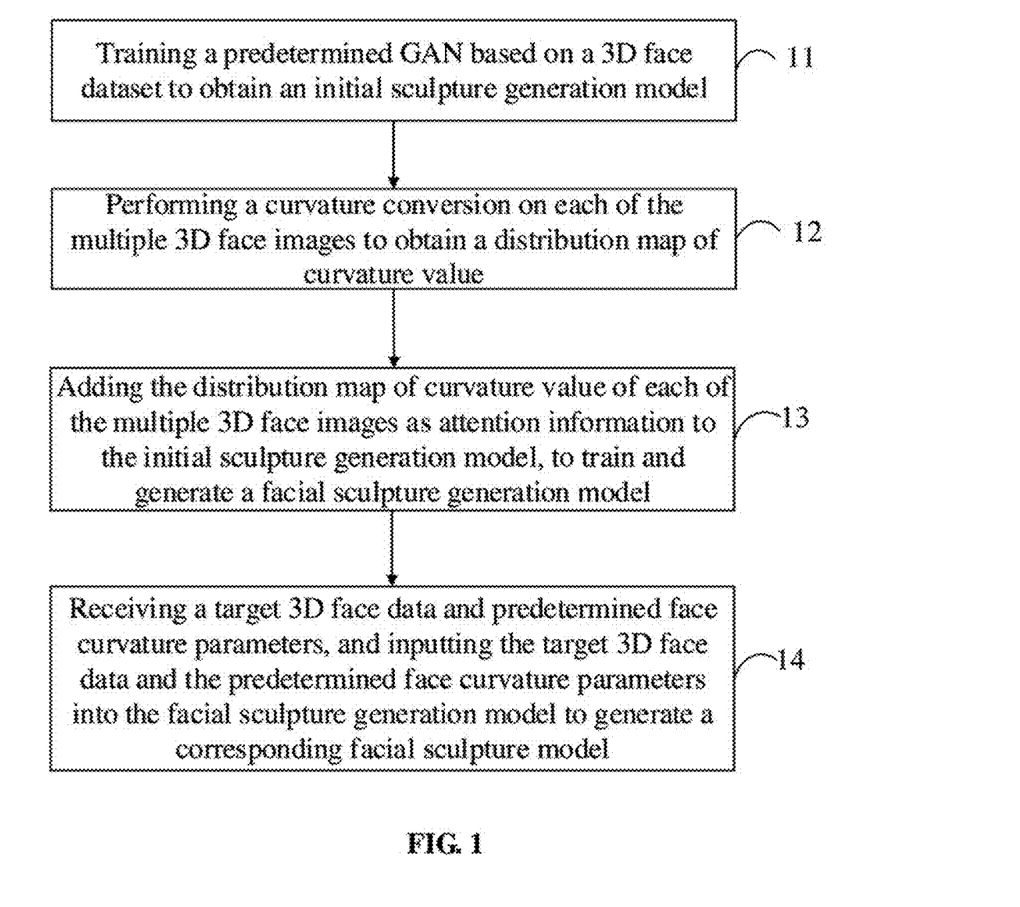
FIG. 1 is a schematic flow chart of an embodiment of a method for generating a model for facial sculpture according to the present disclosure.

FIG. 1 shows a schematic flow chart of an embodiment of a method for generating a model for facial sculpture according to the present disclosure.

As shown in FIG. 1, the method applicable in a computing device can include the following steps. According to different requirements, order of the steps in the flow chart may be changed, and some may be omitted. Within each step, sub-steps may be sub-numbered.

In block 11, a predetermined generative adversarial network (GAN) is trained based on a three dimensional (3D) face dataset to obtain an initial sculpture generation model.

In one embodiment, the 3D face dataset can be pre-established before model training and stored in a specific storage area/device. The 3D face dataset can comprise 3D face data of multiple 3D face images. The GAN can be a progressive growing GAN (PGGAN). In other embodiments, the GAN can also be other types of GANs.

In one embodiment, when the predetermined GAN is trained based on the 3D face dataset, the 3D face data of each of the multiple 3D face images can be converted into grey scale image data with height information as a training dataset for training the PGGAN. The grey scale image data is two dimensional (2D) data. The PGGAN being trained based on the 3D face dataset can comprise: converting the 3D face data of each of the multiple 3D face images into the grey scale image data with height information; training the PGGAN based on the grey scale image data with height information to obtain a height map generation network; and performing a 3D conversion on height maps outputted by the height map generation network to obtain a 3D sculpture model.

In one embodiment, the initial sculpture generation model can be divided into three parts. A first part of the initial sculpture generation model can be a 3D-2D conversion unit, a second part of the initial sculpture generation model can be the PGGAN, and a third part of the initial sculpture generation model can be a 2D-3D conversion unit. The 2D-3D conversion unit can convert height maps outputted by the height map generation network to 3D format files, for example, ".obj"format and".ply" format. The 3D format files converted by the 2D-3D conversion unit can be opened by current 3D visualization software.

In one embodiment, the PGGAN can be divided into two parts. A first part of the PGGAN can be a height map generation model and a second part of the PGGAN can be a height map discrimination model. The height map generation model is configured to generate a height map according to the grey scale image data with height information. The height map discrimination model is configured to determine whether a quality of generation of the height map meets a predetermined standard. The predetermined standard can be defined according to a practical application, such as the height map discrimination model determines whether the height map generated by the height map generation model is lifelike.

In one embodiment, the training of the PGGAN comprises: converting the 3D face data of each of the multiple 3D face images into the grey scale image data with height information by the 2D-3D conversion unit; inputting the grey scale image data with height information to the height map generation model to obtain multiple height maps; determining whether the generation quality of each of the multiple height maps meets the predetermined standard by the height map discrimination model; counting a generation accuracy rate of the multiple height maps based on determined results of the height map discrimination model; and defining trained PGGAN as the height map generation network if the generation accuracy rate of height map is greater than a predetermined threshold. When the generation accuracy rate is greater than the predetermined threshold, it means that the trained PGGAN does meet model requirements, and the PGGAN training can be ended. When the generation accuracy rate is less than the predetermined threshold, generation parameters of the height map generation model can be adjusted, and then the adjusted PGGAN is retrained through the grey scale image data with height information until the generation accuracy rate is greater than the predetermined threshold.

It can be understood that, a 3D face image can be converted into a grey scale image with height information, and 3D face data can be converted into grey scale image data with height information.

In one embodiment, the predetermined threshold can be defined and adjusted according to a practical application. For example, the predetermined threshold is defined as ninety-six percent.

Figure 4A:
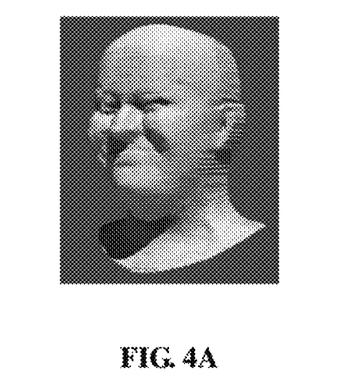
FIG. 4A-4C are facial sculpture models generated by facial sculpture generation models with different sizes of curvature filter operators of an embodiment.

In one embodiment, when the initial sculpture generation model is obtained, a facial sculpture model without art processing can be generated by inputting target 3D face data into the initial sculpture generation model, as shown in FIG. 4A.

In block 12, a curvature conversion is performed on each of the multiple 3D face images to obtain a distribution map of curvature value.

In one embodiment, a curvature value is a physical quantity of a degree of a curve or a curved surface. A curvature value of a straight line is defined as zero.

In one embodiment, a 3D face image can be defined as a 3D curved surface. An arbitrary point P1 of the 3D curved surface can be defined as coordinates (x, y, f(x, y)) of a 3D coordinate system, x represents a coordinate value of the X-axis of the 3D coordinate system, y represents a coordinate value of the Y-axis of the 3D coordinate system, and f(x, y) represents a coordinate value of the Z-axis of the 3D coordinate system. A curvature value of the point P1(x, y, f(x, y)) can be calculated through an average curvature calculation algorithm, the curvature value of the point P1(x, y, f(x, y)) calculated based on the average curvature calculation algorithm can comprise: selecting a predetermined area centered on the point P1(x, y, f(x, y)); and estimating the curvature value of the point P1(x, y, f(x, y)) based on points of the predetermined area. A formula f1 for calculating the curvature value of the point P1(x, y, f(x, y)) can comprise:

$$H(x,y)=(1+f_y^2)f_{xx}-2f_x f_y f_{xy}+(1+f_x^2)f_{yy}/2(1+f_x^2+f_y^2)^{3/2}.$$

In the formula f1, $f_x$ represents a first derivative in a X-axis direction, $f_{xx}$ represents a second derivative in the X-axis direction, $f_y$ represents a first derivative in a Y-axis direction, $f_{yy}$ represents a second derivative in the Y-axis direction, and $f_{xy}$ represents a mixed derivative in the X-axis direction and the Y-axis direction.

For calculating the derivatives in the formula f1, calculation methods can include: selecting a predetermined area centered on the point P1(x, y, f(x, y)), wherein the predetermined area comprises k*k points and k represents a size of a curvature filter operator; and using approximation of higher-order polynomials f2 to solve. The higher-order polynomials 2 can comprise:

$$g_{ij}(x,y)=a_{ij}+b_{ij}(x-x_i)+c_{ij}(y-y_j)+d_{ij}(x-x_i)(y-y_j)+e_{ij}(x-x_i)^2+f_{ij}(y-y_j).$$

In the higher-order polynomials f2, i=1, 2, . . . , N, j=1, 2, . . . , M; a, b, c, d, e, and f represent polynomial fitting parameters, a, b, c, d, e, and f can be constant terms; and mathematic relations between the parameters of b, c, d, e, and f and the derivatives of formula f1 are shown in a formula f5. N represents a length of the grayscale image with height information, and M represents a width of the grayscale image with height information. In other embodiments, the parameters of a, b, c, d, e, and f can be obtained by a least squares fitting of the curved surface.

In one embodiment, the higher-order polynomials f2 can be solved in a matrix form to obtain a formula f3, the formula f3 can comprise:

$$[a,b,c,d,e,f]^T=GA(A^TA)^{-1};$$

in the formula f3, G represents a row vector formed by numerical values of the k*k points, A represents a matrix formed by relative position information of the k*k points, $A^T$ represents a transposed matrix of the matrix A, A represents an inverse matrix of the matrix A, and $C=A(A^TA)^{-1}$ and C is defined to the curvature filter operator. A convolution operation of the curvature filter operator C and the grey scale image with height information can obtain six parameter matrices A1, B1, C1, D1, E1, and F1, as shown formula f4. Each parameter matrix A1~F1 corresponds to distribution information of each parameter a~f on the grey scale image with height information. The formula f4 can be: $[A1, B1, C1, D1, E1, F]^T=IMG \odot C$. In the formula f4, IMG represents the grey scale image with height information, A1 represents a parameter matrix formed by the parameter a, a size of the parameter matrix A1 can be equal to the length and width of the grey scale image with height information, and a value of each pixel is a value of a polynomial fitting parameter of the point. Similarly, B1 represents a parameter matrix formed by the parameter b, C1 represents a parameter matrix formed by the parameter c, D1 represents a parameter matrix formed by the parameter d, E1 represents a parameter matrix formed by the parameter e, and F1 represents a parameter matrix formed by the parameter f. The mathematical relations between the parameters of b, c, d, e, and f and the derivatives of formula f1 are shown in the formula f5, the formula f5 can comprise: $f_x$ $(x_i,y_j)=b_{ij}$, $f_y$ $(x_i,y_j)=c_{ij}$, $f_{xy}$ $(x_i,y_j)=d_{ij}$, $f_{xx}(x_i,y_j)=2e_{ij}$, $f_{yy}$ $(x_i,y_j)=2f_{ij}$.

Figure 2A:
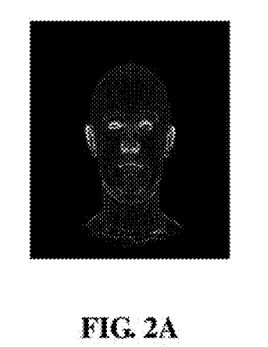
FIG. 2A-2C are distribution maps of curvature values corresponding to different sizes of curvature filter operators of an embodiment.
Figure 2B:
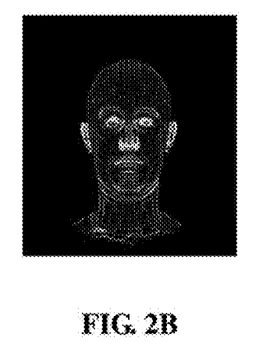
Figure 2C:
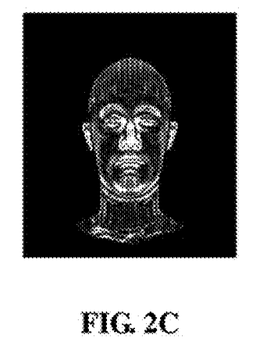

The six parameter matrices A1-F1 of the formula f4 can be substituted into the formula f5 and the formula f1. Then, the curvature value of the point P1(x, y, f(x, y)) can be calculated. In the above calculation process of the curvature value of point P1(x, y, f(x, y)), the parameter k can be configured in advance. A value of k*k represents how many points around the point P1(x, y, f(x, y)) are used to estimate the curvature value of point P1(x, y, f(x, y)) in the above calculation process. The larger the value of k*k, the more sensitive it will be to large curvature information in a distribution map of curvature value. The brighter area in the distribution map of curvature value represents the larger curvature value. The distribution map of curvature value corresponding to curvature filter operators of different sizes are shown in FIGS. 2A-2C. In FIG. 2A, k=7; in FIG. 2B, k=11; and in FIG. 2C, k=21. As shown in FIG. 2C, because curvature values near the nose of the model are larger, the area near the nose is brighter.

Similarly, other points on the 3D curved surface can also be calculated through the above calculation process to obtain a curvature value. Then, the distribution map of curvature value corresponding to the 3D face image can be obtained based on the curvature value of each point of the 3D curved surface.

In block 13, the distribution map of curvature value of each of the multiple 3D face images is added as attention information to the initial sculpture generation model, to train and generate a facial sculpture generation model.

In one embodiment, the curvature value of the 3D face image can represent height change information of a 3D face. For example, curvature values of a nose area are relatively large, and curvature values of a forehead are relatively small, etc. The distribution map of curvature value of each of the multiple 3D face images can be added to the initial sculpture generation model as attention information to train and obtain the facial sculpture generation model capable of generating artistic facial sculpture models. Specifically, the distribution map of curvature value of the 3D face image can be added to the PGGAN as attention information, when the PGGAN generates a height map, curvature value information of the 3D face image can also be trained in the PGGAN. Then, facial sculpture models with exaggerated artistic features can be generated by changing curvature values of some parts of the 3D face image.

Figure 3:
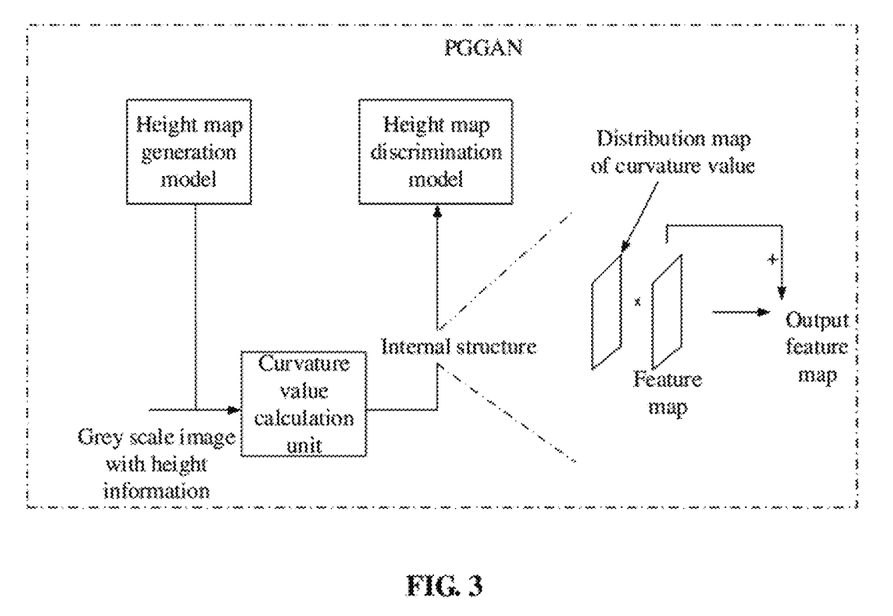
FIG. 3 is a schematic structure of a PGGAN with curvature value attention mechanism of an embodiment.

In one embodiment, the PGGAN with curvature value attention mechanism is shown in FIG. 3. In FIG. 3, the PGGAN includes the height map generation model, the height map discrimination model, and a curvature value calculation unit. The curvature value calculation unit can calculate curvature values of each point of the 3D face image. The grey scale image data with height information can be used as training data for PGGAN, and curvature values of the 3D face image can be used as data of model attention mechanism for training. The facial sculpture generation model can generate facial sculpture models with exaggerated artistic features after training.

In block 14, a target 3D face data and predetermined face curvature parameters are received, and the target 3D face data and the predetermined face curvature parameters are inputted into the facial sculpture generation model to generate a corresponding facial sculpture model.

In one embodiment, when the facial sculpture generation model is trained, the target 3D face data and the predetermined face curvature parameters can be received and inputted to the facial sculpture generation model, and the facial sculpture generation model can generate the corresponding facial sculpture model. The predetermined face curvature parameters can be set by a user, and the predetermined face curvature parameters can comprise a value of the curvature filter operator defined by the user.

In one embodiment, the facial sculpture generation model can be configured as an end-to-end model, and the end-to-end model can provide an operation interface for the user. Then, the user can input 3D face data of a target facial sculpture model and face curvature parameters to the facial sculpture generation model, and the facial sculpture generation model can automatically generate corresponding sculpture results.

Figure 4B:
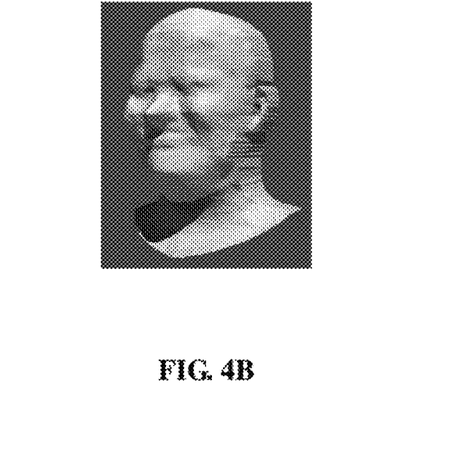
Figure 4C:
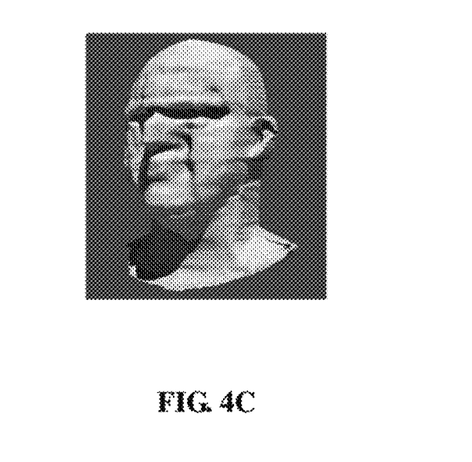

In FIGS. 4A to 4C, three facial sculpture models correspond to the same 3D face data, but they define different values of curvature filter operators. In FIG. 4A, the value of the curvature filter operator is zero, which is equivalent to not using the curvature value attention mechanism, and further can be equivalent to a sculpture model generated by the initial sculpture generation model. In FIG. 4B, the value of the curvature filter operator is eleven. In FIG. 4C, the value of the curvature filter operator is twenty-one. Compared with FIG. 4A, FIGS. 4B and 4C achieve an art effect of changing facial surface modeling. For example, in FIG. 4C (compared with FIG. 4A), the nose has become a hooked nose and the eye sockets are deeper (making a person look unpredictable), and the exaggerated angular face is looking more powerful. The sculpture model in FIG. 4C conveys effects of strength and wisdom.

Figure 5:
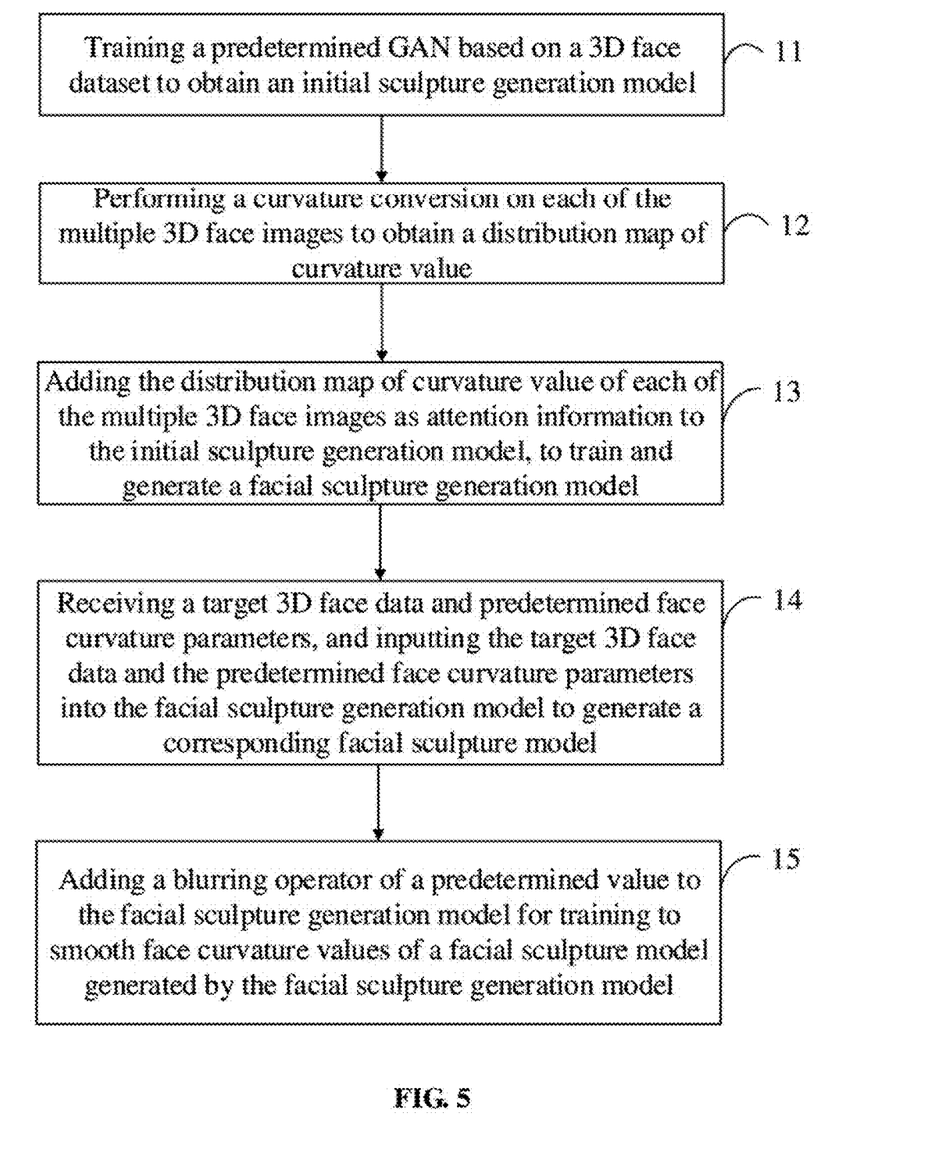
FIG. 5 is a schematic flow chart of an embodiment of another method for generating a model for facial sculpture according to the present disclosure.

FIG. 5 shows a schematic flow chart of another embodiment of a facial sculpture model generating method according to the present disclosure.

As shown in FIG. 5, the method applicable in the computing device can further include a step 15. According to different requirements, the order of the steps in the flow may be changed, and some may be omitted. Within each step, sub-steps may be sub-numbered.

In block 15, a blurring operator of a predetermined value is added to the facial sculpture generation model for training to smooth face curvature values of a facial sculpture model generated by the facial sculpture generation model.

In one embodiment, when the blurring operator is added to the facial sculpture generation model for training, an art generation ability of the facial sculpture generation model can be improved. The blurring operator can be a convolution kernel. The convolution kernel can be configured to perform a convolution operation with the distribution map of curvature value of each of the multiple 3D face images during the facial sculpture generation model training. Then, face curvature values of a facial sculpture model generated by the facial sculpture generation model can become smooth, face of the facial sculpture mode can become blurred, and artistry of the facial sculpture model is enhanced.

Figure 4D:
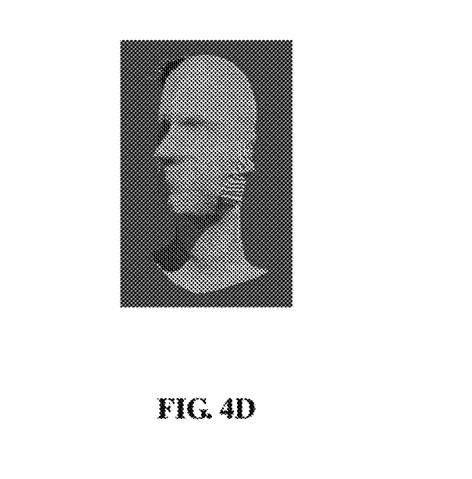
FIG. 4D is a facial sculpture model generated by a facial sculpture generation model that adds a blurring operator and a curvature value attention mechanism of an embodiment.

For example, as shown in FIG. 4D, the value of the blurring operator is 5*5. The facial sculpture model of FIG. 4D is generated by a facial sculpture generation model with the 5*5 convolution kernel and the curvature value attention mechanism. Facial features of the facial sculpture model become blurred, especially, the mouth and the eyes are flattened, and a boundary between the nose and the mouth is indeterminate. The facial sculpture model of FIG. 4D suggests being covered by a veil, and the facial sculpture model conveys a sense of distance.

In one embodiment, when the facial sculpture generation model is trained based on the curvature value attention mechanism and the blurring operator, the user can pre-set effects to be generated by the facial sculpture generation model. For example, the user can define artistic degree parameters to the facial sculpture generation model. When the user inputs 3D face data of the target facial sculpture model and the artistic degree parameters, the facial sculpture generation model can automatically generate corresponding target facial sculpture model. The artistic degree parameter can include the value of the curvature filter operator and the blurring operator.

In one embodiment, the blurring operator can be set to a fixed value, and the user can choose whether to add the blurring operator. The value of the blurring operator can be adjusted, and different values of the blurring operators correspond to different degrees of blurring. For example, a 7*7 blurring operator can be set for training to obtain a facial sculpture model different from that shown in FIG. 4D.

The facial sculpture model generating method provided by embodiments of the present disclosure realizes a combination of artistic effects and the GAN through the curvature value attention mechanism, and further training by adding the blurring operator, which improves the artistic effect of the facial sculpture model generated by trained facial sculpture generation model. The trained facial sculpture generation model can be configured as the end-to-end model, which can provide the operation interface for the user. A threshold of artistic creation is reduced, and all users have an opportunity to create art sculpture models.

Figure 6:
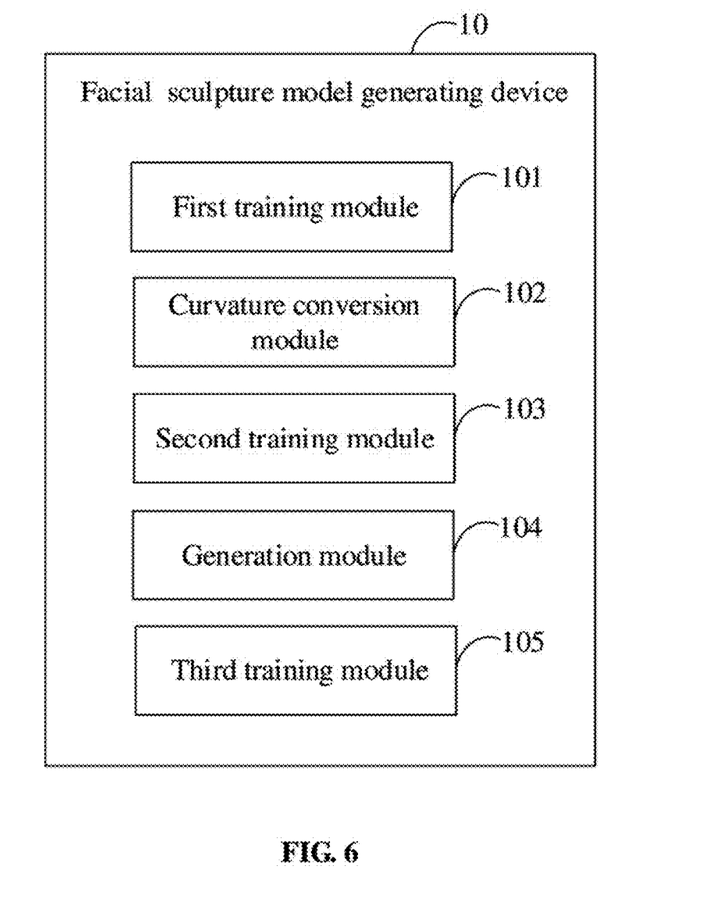
FIG. 6 is a schematic structural diagram of an embodiment of a device for generating a model for facial sculpture according to the present disclosure.

FIG. 6 shows a schematic structural diagram of an embodiment of a device for generating a model of facial sculpture according to the present disclosure.

In one embodiment, the device (facial sculpture model generating device) 10 can include a plurality of functional modules consisting of program code segments. The program code of each program code segments in the facial sculpture model generating device 10 may be stored in a memory of a computing device and executed by at least one processor to perform (described in detail in FIG. 1) a function of generating facial sculpture models.

In an embodiment, the facial sculpture model generating device 10 can be divided into a plurality of functional modules, according to the performed functions. The functional modules can include: a first training module 101, a curvature conversion module 102, a second training module 103, a generation module 104, and a third training module 105. A module as referred to in the present disclosure refers to a series of computer program segments that can be executed by at least one processor and are capable of performing fixed functions, which are stored in a memory. In this embodiment, the functions of each module will be detailed in the following embodiments.

The first training module 101 is configured to train a predetermined GAN based on a 3D face dataset to obtain an initial sculpture generation model.

In one embodiment, the 3D face dataset can be pre-established before model training and stored in a specific storage area/device. The 3D face dataset can comprise 3D face data of multiple 3D face images. The GAN can be a PGGAN. In other embodiments, the GAN can also be other types of GANs.

In one embodiment, when the first training module 101 trains the predetermined GAN based on the 3D face dataset, the 3D face data of each of the multiple 3D face images can be converted into grey scale image data with height information as a training dataset for training the PGGAN. The grey scale image data is two-dimensional (2D) data. The first training module 101 training the PGGAN based on the 3D face dataset can comprise: converting the 3D face data of each of the multiple 3D face images into the grey scale image data with height information; training the PGGAN based on the grey scale image data with height information to obtain a height map generation network; and performing a 3D conversion on height maps outputted by the height map generation network to obtain a 3D sculpture model.

In one embodiment, the initial sculpture generation model can be divided into three parts. A first part of the initial sculpture generation model can be a 3D-2D conversion unit, a second part of the initial sculpture generation model can be the PGGAN, and a third part of the initial sculpture generation model can be a 2D-3D conversion unit. The 2D-3D conversion unit can convert height maps outputted by the height map generation network to 3D format files, for example, ".obj"format and".ply" format. The 3D format files converted by the 2D-3D conversion unit can be opened by current 3D visualization software.

In one embodiment, the PGGAN can be divided into two parts. A first part of the PGGAN can be a height map generation model and a second part of the PGGAN can be a height map discrimination model. The height map generation model is configured to generate a height map according to the grey scale image data with height information. The height map discrimination model is configured to determine whether a quality of generation of the height map meets a predetermined standard. The predetermined standard can be defined according to a practical application, such as the height map discrimination model determines whether the height map generated by the height map generation model is lifelike.

In one embodiment, the training of the PGGAN comprises: converting the 3D face data of each of the multiple 3D face images into the grey scale image data with height information by the 2D-3D conversion unit; inputting the grey scale image data with height information to the height map generation model to obtain multiple height maps; determining whether the generation quality of each of the multiple height maps meets the predetermined standard by the height map discrimination model; counting a generation accuracy rate of the multiple height maps based on determined results of the height map discrimination model; and defining trained PGGAN as the height map generation network if the generation accuracy rate of height map is greater than a predetermined threshold. When the generation accuracy rate is greater than the predetermined threshold, it means that the trained PGGAN does meet model requirements, and the PGGAN training can be ended. When the generation accuracy rate is less than the predetermined threshold, generation parameters of the height map generation model can be adjusted, and then the adjusted PGGAN is retrained through the grey scale image data with height information until the generation accuracy rate is greater than the predetermined threshold.

It can be understood that, a 3D face image can be converted into a grey scale image with height information, and 3D face data can be converted into grey scale image data with height information.

In one embodiment, the predetermined threshold can be defined and adjusted according to a practical application. For example, the predetermined threshold is defined as ninety-six percent.

In one embodiment, when the initial sculpture generation model is trained by the first training module 101, a facial sculpture model without art processing can be generated by inputting target 3D face data into the initial sculpture generation model, as shown in FIG. 4A.

The curvature conversion module 102 is configured to perform a curvature conversion on each of the multiple 3D face images to obtain a distribution map of curvature value.

In one embodiment, a curvature value is a physical quantity of a degree of a curve or a curved surface. A curvature value of a straight line is defined as zero.

In one embodiment, a 3D face image can be defined as a 3D curved surface. An arbitrary point P1 of the 3D curved surface can be defined as coordinates (x, y, f(x, y)) of a 3D coordinate system, x represents a coordinate value of the X-axis of the 3D coordinate system, y represents a coordinate value of the Y-axis of the 3D coordinate system, and f(x, y) represents a coordinate value of the Z-axis of the 3D coordinate system. A curvature value of the point P1(x, y, f(x, y)) can be calculated by the curvature conversion module 102 through an average curvature calculation algorithm, the curvature value of the point P1(x, y, f(x, y)) calculated based on the average curvature calculation algorithm can comprise: selecting a predetermined area centered on the point P1(x, y, f(x, y)); and estimating the curvature value of the point P1(x, y, f(x, y)) based on points of the predetermined area. A formula f1 for calculating the curvature value of the point P1(x, y, f(x, y)) can comprise:

$$H(x,y)=(1+f_y^2)f_{xx}-2f_xf_yf_{xy}+(1+f_x^2)f_{yy}/2(1+f_x^2+f_y^2)^{3/2}.$$

In the formula f1, $f_x$ represents a first derivative in a X-axis direction, $f_{xx}$ represents a second derivative in the X-axis direction, $f_y$ represents a first derivative in a Y-axis direction, $f_{yy}$ represents a second derivative in the Y-axis direction, and $f_{xy}$ represents a mixed derivative in the X-axis direction and the Y-axis direction.

For calculating the derivatives in the formula f1, calculation methods can include: selecting a predetermined area centered on the point P1(x, y, f(x, y)), wherein the predetermined area comprises k*k points and k represents a size of a curvature filter operator; and using approximation of higher-order polynomials f2 to solve. The higher-order polynomials f2 can comprise:

$$g_{ij}(x,y)=a_{ij}+b_{ij}(x-x_i)+c_{ij}(y-y_j)+d_{ij}(x-x_i)(y-y_j)+e_{ij}(x-x_i)^2+f_{ij}(y-y_j)^2;$$

in the higher-order polynomials f2, i=1, 2, . . . , N, j=1, 2, . . . , M; a, b, c, d, e, and f represent polynomial fitting parameters, a, b, c, d, e, and f can be constant terms; and mathematic relations between the parameters of b, c, d, e, and f and the derivatives of formula f1 are shown in a formula f5. N represents a length of the grayscale image with height information, and M represents a width of the grayscale image with height information. In other embodiments, the parameters of a, b, c, d, e, and f can be obtained by a least squares fitting of the curved surface.

In one embodiment, the higher-order polynomials f2 can be solved in a matrix form to obtain a formula f3, the formula f3 can comprise:

$$[a,b,c,d,e,f]^T=GA(A^TA)^{-1};$$

in the formula f3, G represents a row vector formed by numerical values of the k*k points, A represents a matrix formed by relative position information of the k*k points, $A^T$ represents a transposed matrix of the matrix A, $A^{-1}$ represents an inverse matrix of the matrix A, and $C=A(A^TA)^{-1}$ and C is defined to the curvature filter operator. A convolution operation of the curvature filter operator C and the grey scale image with height information can obtain six parameter matrices A1, B1, C1, D1, E1, and F1, as shown in formula f4. Each parameter matrix A1~F1 corresponds to distribution information of each parameter a~f on the grey scale image with height information. The formula f4 can be: [A1, B1, C1, D1, E1, F1]T=IMG⊙C. In the formula f4, IMG represents the grey scale image with height information, A1 represents a parameter matrix formed by the parameter a, a size of the parameter matrix A1 can be equal to the length and width of the grey scale image with height information, and a value of each pixel is a value of a polynomial fitting parameter of the point. Similarly, B1 represents a parameter matrix formed by the parameter b, C1 represents a parameter matrix formed by the parameter c, D1 represents a parameter matrix formed by the parameter d, E1 represents a parameter matrix formed by the parameter e, and F1 represents a parameter matrix formed by the parameter f. The mathematical relations between the parameters of b, c, d, e, and f and the derivatives of formula f1 are shown in the formula f5, the formula f5 can comprise: $f_x(x_i,y_j)=b_{ij}$, $f_y(x_i,y_j)=c_{ij}$, $f_{xy}(x_i,y_j)=d_{ij}$, $f_{xx}(x_i,y_j)=2e_{ij}$, $f_{yy}(x_i,y_j)=2f_{ij}$.

The six parameter matrices A1-F1 of the formula f4 can be substituted into the formula f5 and the formula f1. Then, the curvature value of the point P1(x, y, f(x, y)) can be calculated. In the above calculation process of the curvature value of point P1 P1(x, y, f(x, y)), the parameter k can be configured in advance. A value of k*k represents how many points around the point P1(x, y, f(x, y)) are used to estimate the curvature value of point P1(x, y, f(x, y)) in the above calculation process. The larger the value of k*k, the more sensitive it will be to large curvature information in a distribution map of curvature value. The brighter area in the distribution map of curvature value represents the larger curvature value. The distribution map of curvature value corresponding to curvature filter operators of different sizes are shown in FIGS. 2A-2C. In FIG. 2A, k=7; in FIG. 2B, k=11; and in FIG. 2C, k=21. As shown in FIG. 2C, because curvature values near the nose are larger, the area near the nose of the model is brighter.

Similarly, other points on the 3D curved surface can also be calculated by the curvature conversion module 102 through the above calculation process to obtain a curvature value. Then, the distribution map of curvature value corresponding to the 3D face image can be obtained based on the curvature value of each point of the 3D curved surface.

The second training module 103 is configured to add the distribution map of curvature value of each of the multiple 3D face images as attention information to the initial sculpture generation model, to train and generate a facial sculpture generation model.

In one embodiment, the curvature value of the 3D face image can represent height change information of a 3D face. For example, curvature values of a nose area are relatively large, and curvature values of a forehead are relatively small, etc. The distribution map of curvature value of each of the multiple 3D face images can be added by the second training module 103 into the initial sculpture generation model as attention information to train and obtain the facial sculpture generation model capable of generating artistic facial sculpture models. Specifically, when the second training module 103 adds the distribution map of curvature value of the 3D face image into the PGGAN as attention information, the PGGAN generates a height map, and curvature value information of the 3D face image can also be trained in the PGGAN. Then, facial sculpture models with exaggerated artistic features can be generated by changing curvature values of some parts of the 3D face image.

In one embodiment, the PGGAN with curvature value attention mechanism is shown in FIG. 3. In FIG. 3, the PGGAN includes the height map generation model, the height map discrimination model, and a curvature value calculation unit. The curvature value calculation unit can calculate curvature values of each point of the 3D face image. The grey scale image data with height information can be used as training data for PGGAN, and curvature values of the 3D face image can be used as data of model attention mechanism for training. The facial sculpture generation model can generate facial sculpture models with exaggerated artistic features after training.

The generation module 104 is configured to receive a target 3D face data and predetermined face curvature parameters, and input the target 3D face data and the predetermined face curvature parameters into the facial sculpture generation model to generate a corresponding facial sculpture model.

In one embodiment, when the facial sculpture generation model is trained, the generation module 104 can receive and input the target 3D face data and the predetermined face curvature parameters to the facial sculpture generation model, and the facial sculpture generation model can generate the corresponding facial sculpture model. The predetermined face curvature parameters can be set by a user, and the predetermined face curvature parameters can comprise a value of the curvature filter operator defined by the user.

In one embodiment, the facial sculpture generation model can be configured as an end-to-end model, and the end-to-end model can provide an operation interface for the user. Then, the user can input 3D face data of a target facial sculpture model and face curvature parameters to the facial sculpture generation model, and the facial sculpture generation model can automatically generate corresponding sculpture results.

In FIGS. 4A to 4C, three facial sculpture models correspond to the same 3D face data, but they define different values of curvature filter operators. In FIG. 4A, the value of the curvature filter operator is zero, which is equivalent to not using the curvature value attention mechanism, and further can be equivalent to a sculpture model generated by the initial sculpture generation model. In FIG. 4B, the value of the curvature filter operator is eleven. In FIG. 4C, the value of the curvature filter operator is twenty-one. Compared with FIG. 4A, FIGS. 4B and 4C achieve an art effect of changing facial surface modeling. For example, in FIG. 4C (compared with FIG. 4A), the nose has become a hooked nose and the eye sockets are deeper (making a person look unpredictable), and the exaggerated angular face is looking more powerful. The sculpture model in FIG. 4C conveys effects of strength and wisdom.

The third training module 105 is configured to add a blurring operator of a predetermined value to the facial sculpture generation model for training to smooth face curvature values of a facial sculpture model generated by the facial sculpture generation model.

In one embodiment, when the third training module 105 adds the blurring operator to the facial sculpture generation model for training, an art generation ability of the facial sculpture generation model can be improved. The blurring operator can be a convolution kernel. The convolution kernel can be configured to perform a convolution operation with the distribution map of curvature value of each of the multiple 3D face images during the facial sculpture generation model training. Then, face curvature values of a facial sculpture model generated by the facial sculpture generation model can become smooth, face of the facial sculpture mode can become blurred, and artistry of the facial sculpture model is enhanced.

For example, as shown in FIG. 4D, the value of the blurring operator is 5*5. The facial sculpture model of FIG. 4D is generated by a facial sculpture generation model with the 5*5 convolution kernel and the curvature value attention mechanism. Facial features of the facial sculpture model become blurred, especially, the mouth and the eyes are flattened, and a boundary between the nose and the mouth is indeterminate. The facial sculpture model of FIG. 4D resembles being covered by a veil, and the facial sculpture model conveys a sense of distance.

In one embodiment, when the facial sculpture generation model is trained based on the curvature value attention mechanism and the blurring operator, the user can pre-set effects to be generated by the facial sculpture generation model. For example, the user can define artistic degree parameters to the facial sculpture generation model. When the user inputs 3D face data of the target facial sculpture model and the artistic degree parameters, the facial sculpture generation model can automatically generate corresponding target facial sculpture model. The artistic degree parameter can include the value of the curvature filter operator and the blurring operator.

In one embodiment, the blurring operator can be set to a fixed value, and the user can choose whether to add the blurring operator. The value of the blurring operator can be adjusted, and different values of the blurring operators correspond to different degrees of blurring. For example, a 7*7 blurring operator can be set for training to obtain a facial sculpture model different from that shown in FIG. 4D.

The facial sculpture model generating device provided by embodiments of the present disclosure realizes a combination of artistic effects and the GAN through the curvature value attention mechanism, and further training by adding the blurring operator, which improves the artistic effect of the facial sculpture model generated by trained facial sculpture generation model. The trained facial sculpture generation model can be configured as the end-to-end model, which can provide the operation interface for the user. A threshold of artistic creation is reduced, and all users have an opportunity to create art sculpture models.

Figure 7:
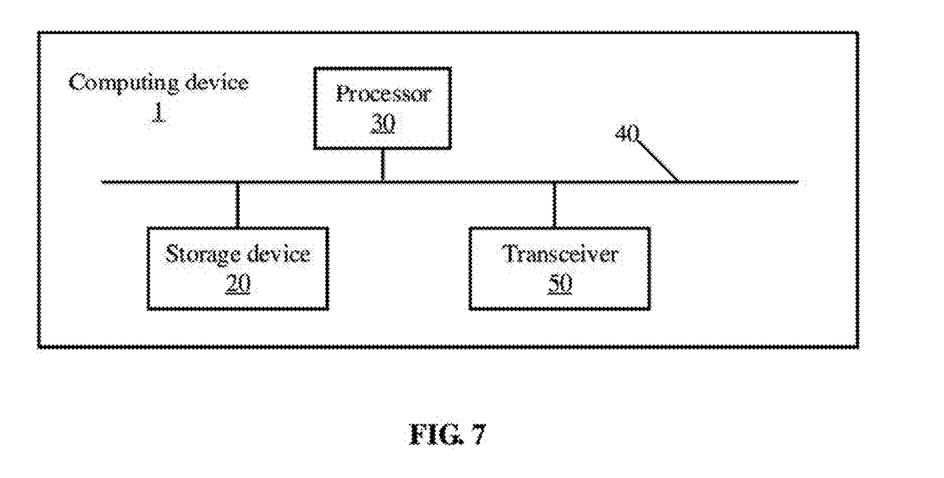
FIG. 7 is a schematic structure of a computing device according to the present disclosure.

FIG. 7 shows a schematic structural diagram of a computing device according to an embodiment of the present disclosure.

As shown in FIG. 7, the computing device 1 may include at least one storage device 20, at least one processor 30, at least one communication bus 40, and a transceiver 50.

The structure of the computing device 1 shown in FIG. 7 does not constitute a limitation of the embodiments of the present disclosure. The computing device 1 may be a bus type structure or a star type structure, and the computing device 1 may also include more or less hardware or software than as illustrated, or it may have different component arrangements.

In at least one embodiment, the computing device 1 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 1 may further include an electronic device. The electronic device can interact with a user through a keyboard, a mouse, a remote controller, a touch panel or a voice control device, for example, individual computers, tablets, smartphones, digital cameras, etc.

It should be noted that the computing device 1 is merely an example, other existing examples or future electronic products may be included in the scope of the present disclosure and are included in the reference.

In some embodiments, the at least one storage device 20 stores program codes of computer readable programs and various data, such as the facial sculpture model generating device 10 installed in the computing device 1. The storage device 20 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 1 that can be used to carry or store data.

In some embodiments, the at least one processor 30 may be composed of an integrated circuit, for example, a single packaged integrated circuit, or multiple integrated circuits of same function or different functions. The at least one processor 30 can include one or more central processing units (CPU), a microprocessor, a digital processing chip, a graphics processor, and various control chips. The at least one processor 30 is a control unit of the computing device 1, which connects various components of the computing device 1 using various interfaces and lines. By running or executing a computer program or modules stored in the storage device 20, and by invoking the data stored in the storage device 20, the at least one processor 30 can perform various functions of the computing device 1 and process data of the computing device 1, for example, the at least one processor 30 can perform to generate the facial sculpture model.

In some embodiments, the least one communication bus 40 achieves intercommunication between the at least on storage device 20 and the at least one processor 30, and other components of the computing device 1.

Although not shown, the computing device 1 may further include a power supply (such as a battery) for powering various components. Preferably, the power supply may be logically connected to the at least one processor 30 through a power management device, thereby, the power management device manages functions such as charging, discharging, and power management. The power supply may include various power sources, a recharging device, a power failure detection circuit, a power converter or inverter, a power status indicator, and the like. The computing device 1 may further include various sensors, such as a BLUETOOTH module, a WI-FI module and the like, and details are not described herein.

It should be understood that the described embodiments are for illustrative purposes only and are not limited by the scope of the present disclosure.

The above-described integrated unit implemented in a form of software function modules can be stored in a computer readable storage medium. The above software function modules are stored in a storage medium, and includes a plurality of instructions for causing a computing device (which may be a personal computer, or a network device, etc.) or a processor to execute the method according to various embodiments of the present disclosure.

In one embodiment, referring to FIG. 6, the at least one processor 30 can execute an operating system and various types of applications (such as the facial sculpture model generating device 10) installed in the computing device 1, program codes, and the like. For example, the at least one processor 30 can execute the modules 101-105.

In at least one embodiment, the at least one storage device 20 stores program codes. The at least one processor 30 can invoke the program codes stored in the at least one storage device 20 to perform related functions. For example, the modules described in FIG. 6 are program codes stored in the at least one storage device 20 and executed by the at least one processor 30, to implement the functions of the various modules.

In at least one embodiment, the at least one storage device 20 stores a plurality of instructions that are executed by the at least one processor 30 to implement all or part of the steps of the method described in the embodiments of the present disclosure.

Specifically, the at least one storage device 20 stores the plurality of instructions which when executed by the at least one processor 30 causes the at least one processor 30 to: train a predetermined GAN based on a 3D face dataset to obtain an initial sculpture generation model, wherein the 3D face dataset comprises 3D face data of multiple 3D face images; perform a curvature conversion on each of the multiple 3D face images to obtain a distribution map of curvature value; add the distribution map of curvature value of each of the multiple 3D face images as attention information to the initial sculpture generation model, to train and generate a facial sculpture generation model; receive a target 3D face data and predetermined face curvature parameters, and input the target 3D face data and the predetermined face curvature parameters into the facial sculpture generation model to generate a corresponding facial sculpture model.

Specifically, the at least one processor 30 training the predetermined GAN based on the 3D face dataset comprises:

converting the 3D face data of each of the multiple 3D face images into grey scale image data with height information;

training the predetermined GAN based on the grey scale image data with height information to obtain a height map generation network; and performing a 3D conversion on height maps outputted by the height map generation network. Wherein the predetermined GAN is a PGGAN.

Specifically, the at least one processor 30 training the predetermined GAN based on the grey scale image data with height information to obtain the height map generation network comprises:

inputting the grey scale image data with height information to the predetermined GAN to obtain multiple height maps;

determining whether a generation quality of each of the multiple height maps meets a predetermined standard to count a generation accuracy rate of height map; and defining trained predetermined GAN as the height map generation network if the generation accuracy rate of height map is greater than a predetermined threshold.

Specifically, the at least one processor 30 adding the distribution map of curvature value of each of the multiple 3D face images as the attention information to the initial sculpture generation model comprises:

adding the distribution map of curvature value of each of the multiple 3D face images as the attention information to the predetermined GAN, to obtain the height map generation network based on curvature value attention mechanism.

Specifically, the at least one processor 30 performing the curvature conversion on each of the multiple 3D face images to obtain the distribution map of curvature value comprises:

defining a 3D face image as a 3D curved surface and calculating a curvature value of each point of the 3D curved surface through an average curvature calculation algorithm.

Specifically, the at least one processor 30 calculating the curvature value of each point of the 3D curved surface through the average curvature calculation algorithm comprises:

selecting a point to be calculated from the 3D curved surface, and selecting a predetermined area centered on the point to be calculated; and estimating a curvature value of the point to be calculated based on points of the predetermined area.

Specifically, the at least one processor 30 is further to:

add a blurring operator of a predetermined value to the facial sculpture generation model for training to smooth face curvature values of a facial sculpture model generated by the facial sculpture generation model. Wherein the blurring operator is a convolution kernel.

Specifically, the convolution kernel performs a convolution operation with the distribution map of curvature value of each of the multiple 3D face images during the facial sculpture generation model training.

Such non-transitory storage medium carries instructions that, when executed by a processor of a computing device, causes the computing device to perform a facial sculpture model generating method, the method comprising: training a predetermined GAN based on a 3D face dataset to obtain an initial sculpture generation model, wherein the 3D face dataset comprises 3D face data of multiple 3D face images; performing a curvature conversion on each of the multiple 3D face images to obtain a distribution map of curvature value; adding the distribution map of curvature value of each of the multiple 3D face images as attention information to the initial sculpture generation model, to train and generate a facial sculpture generation model; receiving a target 3D face data and predetermined face curvature parameters, and inputting the target 3D face data and the predetermined face curvature parameters into the facial sculpture generation model to generate a corresponding facial sculpture model.

The embodiments of the above method are expressed as a series of a combination of actions, but those skilled in the art should understand that the present disclosure is not limited by the described action sequence. According to the present disclosure, some steps in the above embodiments can be performed in other sequences or performed simultaneously. Secondly, those skilled in the art should also understand that the embodiments described in the specification are all optional embodiments, and the actions and units involved are not necessarily required by the present disclosure.

In the above embodiments, descriptions of each embodiment have a different focus, and when there is no detail part in a certain embodiment, the relevant parts of other embodiments can be referred to.

In several embodiments provided in the preset application, it should be understood that the disclosed apparatus can be implemented in other ways. For example, the device embodiments described above are merely illustrative. For example, divisions of the unit are only logical function divisions, and there can be other manners of division in actual implementation.

The modules described as separate components may or may not be physically separated, and the components displayed as modules may or may not be physical units. That is, they can be located in one place, or distributed to multiple network units. Some or all of the modules can be selected according to actual needs to achieve the purpose of the method.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims, all changes in the meaning and scope of equivalent elements are to be included in the present disclosure. Any reference signs in the claims should not be construed as limiting the claim.

The above embodiments are only used to illustrate a technical solution and not as restrictions on the technical solution. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the technical solutions or restrict the scope of the technical solution.

What is claimed is:

1. A facial sculpture model generating method comprising:
    training a predetermined generative adversarial network (GAN) based on a three-dimensional (3D) face dataset to obtain an initial sculpture generation model, wherein the 3D face dataset comprises 3D face data of multiple 3D face images;
    performing a curvature conversion on each of the multiple 3D face images to obtain a distribution map of curvature value;
    adding the distribution map of curvature value of each of the multiple 3D face images as attention information to the initial sculpture generation model, to train and generate a facial sculpture generation model based on curvature value attention mechanism;
    adding a blurring operator of a predetermined value to the facial sculpture generation model for training to smooth face curvature values of a facial sculpture model generated by the facial sculpture generation model; and
    receiving a target 3D face data and predetermined face curvature parameters, and inputting the target 3D face data and the predetermined face curvature parameters into the facial sculpture generation model to generate a corresponding facial sculpture model.

2. The facial sculpture model generating method of claim 1, wherein the method of training the predetermined GAN based on the 3D face dataset comprises:
    converting the 3D face data of each of the multiple 3D face images into grey scale image data with height information;
    training the predetermined GAN based on the grey scale image data with height information to obtain a height map generation network; and
    performing a 3D conversion on height maps outputted by the height map generation network;
    wherein the predetermined GAN is a progressive growing GAN (PGGAN).

3. The facial sculpture model generating method of claim 2, wherein the method of training the predetermined GAN based on the grey scale image data with height information to obtain the height map generation network comprises:
    inputting the grey scale image data with height information to the predetermined GAN to obtain multiple height maps;
    determining whether a quality of generation of each of the multiple height maps meets a predetermined standard to count a generation accuracy rate of height map; and
    defining trained predetermined GAN as the height map generation network if the generation accuracy rate of height map is greater than a predetermined threshold.

4. The facial sculpture model generating method of claim 2, wherein the method of adding the distribution map of curvature value of each of the multiple 3D face images as the attention information to the initial sculpture generation model comprises:

adding the distribution map of curvature value of each of the multiple 3D face images as the attention information to the predetermined GAN, to obtain the height map generation network based on curvature value attention mechanism.

5. The facial sculpture model generating method of claim 1, wherein the method of performing the curvature conversion on each of the multiple 3D face images to obtain the distribution map of curvature value comprises:

defining a 3D face image as a 3D curved surface and calculating a curvature value of each point of the 3D curved surface through an average curvature calculation algorithm.

6. The facial sculpture model generating method of claim 5, wherein the method of calculating the curvature value of each point of the 3D curved surface through the average curvature calculation algorithm comprises:

selecting a point to be calculated from the 3D curved surface, and selecting a predetermined area centered on the point to be calculated; and estimating a curvature value of the point to be calculated based on points of the predetermined area.

7. The facial sculpture model generating method of claim 1, wherein the blurring operator is a convolution kernel.

8. The facial sculpture model generating method of claim 7, wherein the convolution kernel performs a convolution operation with the distribution map of curvature value of each of the multiple 3D face images during the facial sculpture generation model training.

9. A facial sculpture model generating device comprising:

at least one processor; and a storage device storing one or more programs which when executed by the at least one processor, causes the at least one processor to:

train a predetermined generative adversarial network (GAN) based on a three-dimensional (3D) face dataset to obtain an initial sculpture generation model, wherein the 3D face dataset comprises 3D face data of multiple 3D face images;

perform a curvature conversion on each of the multiple 3D face images to obtain a distribution map of curvature value;

add the distribution map of curvature value of each of the multiple 3D face images as attention information to the initial sculpture generation model, to train and generate a facial sculpture generation model based on curvature value attention mechanism;

add a blurring operator of a predetermined value to the facial sculpture generation model for training to smooth face curvature values of a facial sculpture model generated by the facial sculpture generation model; and receive a target 3D face data and predetermined face curvature parameters, and input the target 3D face data and the predetermined face curvature parameters into the facial sculpture generation model to generate a corresponding facial sculpture model.

10. The facial sculpture model generating device of claim 9, wherein the at least one processor training the predetermined GAN based on the 3D face dataset comprises:

converting the 3D face data of each of the multiple 3D face images into grey scale image data with height information;

training the predetermined GAN based on the grey scale image data with height information to obtain a height map generation network; and performing a 3D conversion on height maps outputted by the height map generation network;

wherein the predetermined GAN is a progressive growing GAN (PGGAN).

11. The facial sculpture model generating device of claim 10, wherein the at least one processor training the predetermined GAN based on the grey scale image data with height information to obtain the height map generation network comprises:

inputting the grey scale image data with height information to the predetermined GAN to obtain multiple height maps;

determining whether a quality of generation of each of the multiple height maps meets a predetermined standard to count a generation accuracy rate of height map; and defining trained predetermined GAN as the height map generation network if the generation accuracy rate of height map is greater than a predetermined threshold.

12. The facial sculpture model generating device of claim 10, wherein the at least one processor adding the distribution map of curvature value of each of the multiple 3D face images as the attention information to the initial sculpture generation model comprises:

adding the distribution map of curvature value of each of the multiple 3D face images as the attention information to the predetermined GAN, to obtain the height map generation network based on curvature value attention mechanism.

13. The facial sculpture model generating device of claim 9, wherein the at least one processor performing the curvature conversion on each of the multiple 3D face images to obtain the distribution map of curvature value comprises:

defining a 3D face image as a 3D curved surface and calculating a curvature value of each point of the 3D curved surface through an average curvature calculation algorithm.

14. The facial sculpture model generating device of claim 13, wherein the at least one processor calculating the curvature value of each point of the 3D curved surface through the average curvature calculation algorithm comprises:

selecting a point to be calculated from the 3D curved surface, and selecting a predetermined area centered on the point to be calculated; and estimating a curvature value of the point to be calculated based on points of the predetermined area.

15. The facial sculpture model generating device of claim 9, wherein the blurring operator is a convolution kernel.

16. The facial sculpture model generating device of claim 15, wherein the convolution kernel performs a convolution operation with the distribution map of curvature value of each of the multiple 3D face images during the facial sculpture generation model training.

17. A non-transitory storage medium having stored thereon instructions that, when executed by a processor of a computing device, causes the computing device to perform a facial sculpture model generating method, the method comprising:

training a predetermined generative adversarial network (GAN) based on a three-dimensional (3D) face dataset to obtain an initial sculpture generation model, wherein the 3D face dataset comprises 3D face data of multiple 3D face images;

performing a curvature conversion on each of the multiple 3D face images to obtain a distribution map of curvature value;

adding the distribution map of curvature value of each of the multiple 3D face images as attention information to the initial sculpture generation model, to train and generate a facial sculpture generation model based on curvature value attention mechanism;

adding a blurring operator of a predetermined value to the facial sculpture generation model for training to smooth face curvature values of a facial sculpture model generated by the facial sculpture generation model; and receiving a target 3D face data and predetermined face curvature parameters, and inputting the target 3D face data and the predetermined face curvature parameters into the facial sculpture generation model to generate a corresponding facial sculpture model.

18. The non-transitory storage medium of claim 17, wherein the method of training the predetermined GAN based on the 3D face dataset comprises:

converting the 3D face data of each of the multiple 3D face images into grey scale image data with height information;

training the predetermined GAN based on the grey scale image data with height information to obtain a height map generation network; and performing a 3D conversion on height maps outputted by the height map generation network;

wherein the predetermined GAN is a progressive growing GAN (PGGAN).

19. The non-transitory storage medium of claim 18, wherein the method of training the predetermined GAN based on the grey scale image data with height information to obtain the height map generation network comprises:

inputting the grey scale image data with height information to the predetermined GAN to obtain multiple height maps;

determining whether a quality of generation of each of the multiple height maps meets a predetermined standard to count a generation accuracy rate of height map; and defining trained predetermined GAN as the height map generation network if the generation accuracy rate of height map is greater than a predetermined threshold.

20. The non-transitory storage medium of claim 18, wherein the method of adding the distribution map of curvature value of each of the multiple 3D face images as the attention information to the initial sculpture generation model comprises:

adding the distribution map of curvature value of each of the multiple 3D face images as the attention information to the predetermined GAN, to obtain the height map generation network based on curvature value attention mechanism.

\* \* \* \* \*